April 14, 1931. J. ARNO 1,800,202
NONSKID DEVICE FOR TIRES
Filed March 25, 1929
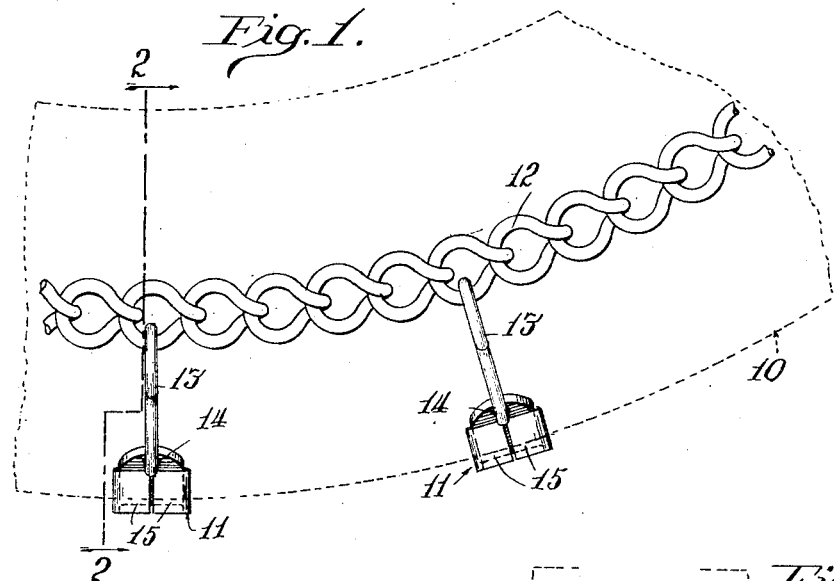
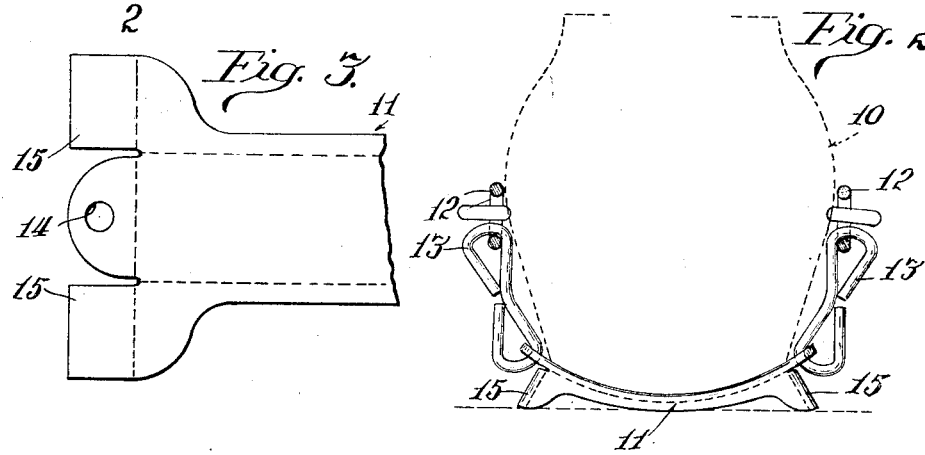
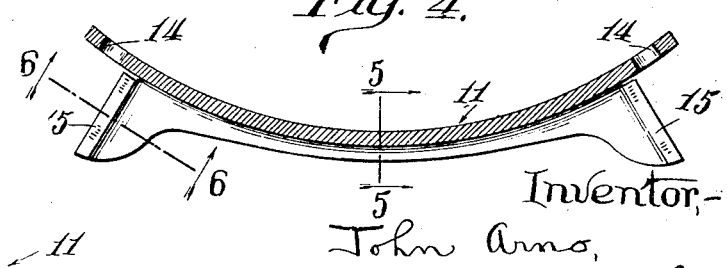
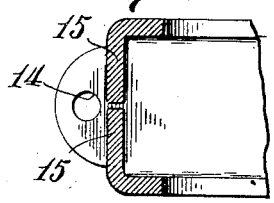

Patented Apr. 14, 1931

1,800,202

UNITED STATES PATENT OFFICE

JOHN ARNO, OF ELGIN, ILLINOIS

NONSKID DEVICE FOR TIRES

Application filed March 25, 1929. Serial No. 349,552.

My invention relates to non-skid devices for tires and it has for its object the provision of a new and improved form and arrangement of parts in a device of this type by reason of which an improved engagement may be had with the roadway for preventing slippage either circumferentially of the tire or laterally. In devices of this type in use heretofore, it has been common to provide a tread portion of some little thickness at the point of maximum pressure of the tire on the ground, a series of such tread portions being provided across the face of the tire at spaced intervals. As the result of such construction, a jolting effect has been produced, serving very materially to increase the vibration. It is one of the objects of my invention to provide an improved construction in which the thickness of the tread portion at the center of the tire transversely thereof is kept to a minimum and by which the desired non-slipping engagement with the ground is effected by parts of increased thickness at opposite sides of the central plane of the tire.

It is another object of my invention to provide a construction by which comparatively sharp edges are presented to the surface of the roadway for preventing skidding while being at the same time protected against cutting into the face of a smooth surface. It is another object of my invention to provide a construction of this type so arranged as to reduce to a minimum the tendency for ice, clay or other foreign matter becoming packed in the outer face of the tread member.

It is another object of my invention to provide a structure of this type of such form that it can be produced readily and cheaply and that it will stand up under extremely hard conditions of use.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a view of a fragmentary portion of the preferred form of my improvements applied to a tire, a portion of which is shown diagrammatically in dotted lines;

Fig. 2 is a cross section taken at line 2—2 of Fig. 1;

Fig. 3 is a face view of one end portion of the blank from which the tread member of my improved construction is formed;

Fig. 4 is a central vertical section through one of my improved tread members; and Figs. 5 and 6 are cross sectional views through the device taken at points corresponding to the lines 5—5 and 6—6 respectively of Fig. 4.

Referring to the several figures of the drawing, in which corresponding parts are indicated by the same reference characters, 10 indicates a tire shown diagrammatically in dotted lines, the same being preferably a pneumatic tire of any approved form. About the outer face of the tire 10, I have provided a plurality of non-skid plates 11 held in position across the outer face of the tire in spaced relation thereabout by means of chains 12 of any approved type at opposite sides of the tire, each of the plates 11 in the construction shown being connected at each end with the chains 12 by means of a link 13, as best shown in Fig. 2.

My improved non-skid plate 11 is preferably formed of comparatively heavy sheet metal pressed into channel form, as is best shown in Fig. 5, and being curved or bowed longitudinally thereof as is clearly shown in Fig. 4 to conform more or less closely to the transverse curvature of the tire,—see Fig. 2. At the opposite ends of the plate 11, openings 14 are provided for engagement of the links 13 with the plate. At opposite end portions of the plate, the flanges of the channel are made considerably wider for providing outwardly extending projections 15, each of such projections being in the form of an angle, as is best shown in Fig. 6, such angled formation being provided by turning the end portions of the flanges inwardly toward each other.

As is best indicated in Fig. 2, the outer edges of the flanges of the channel at the intermediate portion of the plate are in substantial alignment between the outer ends of the projections 15. In other words, the projections 15 terminate substantially at the tangent to the curvature at the middle point of the plate. As a result of this construction, both the flanges at the middle of the plate and the outwardly extending projections 15 at the ends of the plate are brought squarely into engagement with the face of the roadway. The edges of the flanges at the middle of the plate and the ends of the projections 15 are originally sharpened by being made substantially square so as to have an effective engagement with the ground, and the arrangement of the plate is such that as wear takes place the sharpness of the engaging edges is maintained.

By reason of the plates 11 being made comparatively thin at their intermediate portions underneath the outer face of the tread portion of the tire, the plates have very little tendency to increase the jolting effect or to cause vibration in the car. At the same time, the projections 15 are of such length and are so disposed as to enable them to obtain the required grip on the face of the roadway. The arrangement is such that there is only slight tendency for clay or ice to pack in the outer face of the plate, but even if such packing takes place the outer ends of the projections and the outer edges of the flanges at the middle of the plate are still effective for engaging the roadway.

By reason of the effective flatness of the outer face of the plate, brought about by the aligned position of the intermediate portion of the plate between the ends of the projections at the ends of the plate, the plate is kept from cutting into the roadway. In the use of my improved device, the tire is protected against slipping either longitudinally or laterally.

While I prefer to employ the form of device substantially as shown in the drawing, it is to be understood that I do not limit my invention to such details of construction except so far as the claims are so limited by the prior art, it being understood that changes may well be made in the form of the construction without departing from the spirit of my invention.

I claim:—

1. In a non-skid device for tires, the combination of a narrow metal plate curved to have a substantial fit across the face of a tire, and projections carried by said plate at its end portions, comprising outwardly directed side flange portions rigidly connected with said plate and end plate portions rigidly connected with said flange portions and standing in substantially radial position with respect to the curvature of the first named plate.

2. In a non-skid device for tires, the combination of a narrow metal plate provided with outwardly directed flanges along its sides and curved to have a substantial fit across the face of a tire, said flanges being narrow at their middle portions and of increased width at their end portions, and projections carried by said plate at both sides thereof at its end portions, each of said projections comprising a substantially triangular end portion of one of said side flanges and an end plate portion rigidly connected with said triangular flange portion and standing in substantially radial position with respect to the curvature of the first named plate, said projections terminating substantially at a plane which is in tangential position with respect to the outer edges of said side flanges at their middle portions.

JOHN ARNO.